Patented Mar. 6, 1951

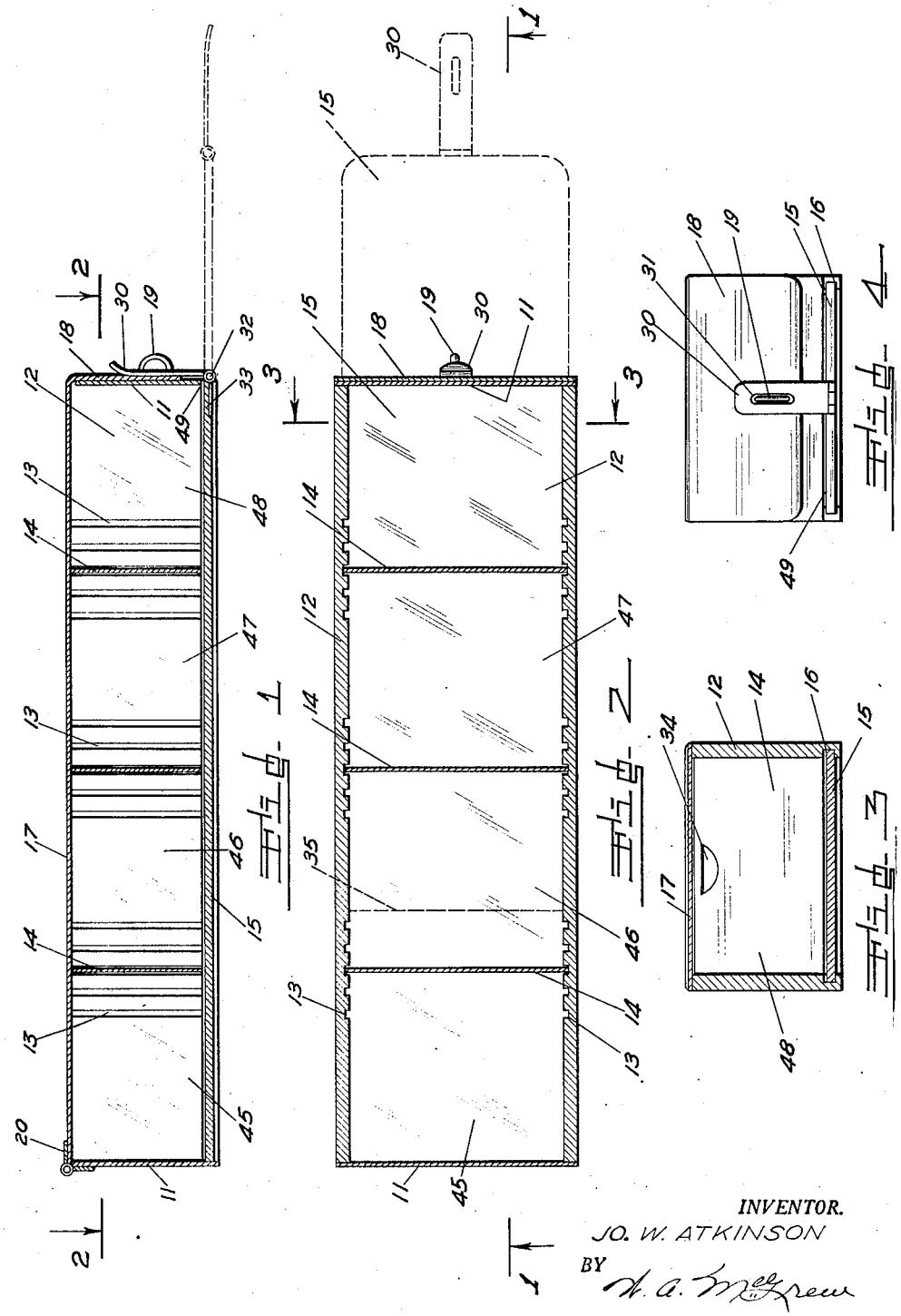

2,543,751

UNITED STATES PATENT OFFICE 2,543,751

MONEY STORAGE CONTAINER

Jo W. Atkinson, Colorado Springs, Colo.

Application January 28, 1946, Serial No. 643,943

5 Claims. (Cl. 232—1)

Heretofore much time has been wasted in counting money upon taking it from the bins of a cash register or other money drawer and placing it into a money bag, for transfer to a safe keeping place overnight, and then the next day taking the money out of that bag and segregating the money therein a second time according to groups of denominations or value upon return to the bins of the cash register or money drawer before business can be resumed.

My invention relates to money storage containers into which money is transferred from cash register or other money drawers, for safe keeping upon removal to another place.

One of the principal objects of my invention is to provide a safe money storage container, with adjustable gates for division of the container into money compartments or bins of a size to correspond with the size of the money bins in the register money drawer from which the money is to be transferred, so that as the money is transferred to the storage container it is also segregated into corresponding money bins in the container, as in the money drawer, by segregation of the money according to value.

Another main object of my invention is to provide such a money storage container with means for permitting subsequent discharge of each segregated money group, separately from the other groups thereof.

Other and further objects of my invention, such as the resultant saving of time in use of my money storage container, will be apparent to those skilled in the art from the following description, claims and drawing; in which drawing:

Figure 1 is a vertical longitudinal cross-sectional view of my money storage container, with the cover in closed position, taken upon the lines 1—1 of Figure 2, looking in the direction of the arrows.

Figure 2 is a horizontal longitudinal cross-sectional view taken upon the lines 2—2 of Figure 1, looking downwardly into my money container in the direction of the arrows.

Figure 3 is a vertical transverse cross-sectional view of one of the money bins of my container taken on the lines 3—3 of Figure 2 looking in the direction of the arrows, with the cover in closed position.

Figure 4 is the end view of the part of my container having the locking facilities, in closed position ready to be locked with a padlock.

In the preferred embodiment of my invention illustrated, my money storage container is made of any suitable material, and comprises a rectangular frame of end walls 11 and side walls 12, fastened together in any conventional manner. Any desired number of vertical slots 13 are cut or formed in the inside of each of the side walls 12, in spaced and opposing relationship to each other, adapted to receive partitions or gates 14 to be slideably inserted therein. A plurality of gates 14, each of the same height as the container, are then slideably inserted in any corresponding pairs of slots 13, as illustrated, for division of the container into as many money bins as may be desired, and so the bins are of corresponding size, preferably, with the bins of the cash drawer from which money is to be transferred to and from my container, thus dividing my container into suitable money storage compartments, such as 45, 46, 47 and 48, or any other desired number or sized compartments. I provide the gates 14 of a width to fit comparatively snugly in the slots 13, so that the pressure of the side walls 12 hold them in place after the gates are inserted in the slots should the bottom slab member 15 be removed. Each gate 14 is capable of being removed and has a cut away notch 34, adapted to form a handle by which the gate may be removed by pulling it upwardly out of the slots 13, if desired.

An L-shaped cover 17, hingedly mounted by means of a strap hinge 20 at the top of the back end of the container, and having a downwardly extending flap portion 18 to which a staple 19 is attached, is provided of a size to close each money bin at the top thereof when the cover 17 is fastened by means of the hasp 30, as illustrated in Figure 1.

I construct the bottom 15 of my container of a single slab member of suitable size removably inserted by sliding into runway grooves 16, formed in the bottom of each side wall 12 in opposing relation, so that when the cover 17 is closed and the slab member 15 is fully inserted, as illustrated in Figure 1, my container is then a completely enclosed rectangular unit of various money compartments.

The end wall 11, at the right as illustrated in Figure 1, is cut away at the bottom at 49 to permit the bottom slab member 15 to be inserted into the grooves 16 from that end. See Figure 4. The other end wall, at the left as illustrated in Figure 1, is not cut away and acts as a stop in that direction against which the bottom 15 rests when fully inserted in place, under the compartments, in the grooves 16.

For safe keeping of money in my container I provide locking means including cooperation of parts carried by the cover 17 and the bottom slab 15, by fastening a staple 19 to the angular portion 18 of the cover, and a hinge hasp 30 at 33 to the bottom slab 15, in such relative positions that when the slab 15 is fully inserted and the cover 17 fully closed, the hasp is swung on its hinge 32 so as to permit its opening 31 to fit over the staple 19 carried by and fastened to the top. It will thus be seen that when a padlock is inserted in the staple 19 and locked, then the cover will be locked in place and at the same time the slidable slab bottom 15 will also be locked in place, as a result, until the padlock is removed.

It is obvious that my invention will result in a savings of many man hours to management.

The dotted line position of the bottom slab member 15, of Figure 2, illustrates the direction in which that slab is pulled in the grooves 16 in operation to discharge the previously segregated money from each compartment, one at a time preferably. In operation, to return the money from my storage container to the desired cash drawer, since as previously explained the storage compartments of my container corresponding in size to the money bins of the drawer, the container is placed on top of the open cash drawer and aligned by the operator so that each compartment is immediately over the drawer money bins into which the money is desired to be transferred, and then the bottom slab member 15 is slidably pulled by the operator, in the grooves 16, to the right as illustrated, in Figure 1, thereby automatically discharging the money of each container compartment into the coresponding money bin of the cash drawer, by gravity, without the need of handling or loss of time for resegregation of the money. Before use, the gates 14 are adjusted in the proper slots 13 to form money compartments, 45, 46, 47, etc., of a size corresponding to the size of those in the cash drawer with which my container is to be used.

While I have only illustrated a few slots 13 and partition gates 14, it is to be understood that any desired deviation as to spacing, size, number or design can be provided as desired, so that I do not mean to limit myself to a four compartment container. There may be any desired number of slots 13, gates 14 and money compartments such as 45–48.

Applicant's invention provides a safe money storage container which permits segregation of the money according to value thereof and subsequent discharge of each segregated group separate from the other money in the container.

My container also saves time in collecting and assembling money from various cash registers in a place of business by the one charged with that responsibility for purpose of count and bank deposit. As removed from the various cash drawers, the operator can then segregate the money into the various money compartments in my container, instead of using the conventional money bag and getting the money all mixed again after he counts it on removal from each drawer and requiring resegregation preparatory to counting the total after he has put all the money in the bag. He saves time by discharging the previously segregated money from each of my compartments for counting one at a time—saving the loss of time in resegregation preparatory to counting and bank depositing, which otherwise would be required.

Having shown and explained my invention, it is apparent that various alterations and modifications can be made in the embodiment of my invention illustrated without deviating from the spirit concept and intent of my invention. Accordingly I wish to be limited only by the appended claims.

In some uses of the present invention, it may be desirable to prevent a complete withdrawal of the bottom plate 15. Suitable stop means may be provided to act on said bottom when it has been drawn far enough to expose substantially the entire portion of compartment 48. A convenient way to accomplish this is to have the bottom portion normally underlying compartment 45 slightly wider than the remainder of said bottom member at its innermost end. Such width would be just sufficient to permit entrance into the grooves 16, after which a small piece of metal or the like would be wedged in each of the grooves 16 adjacent end wall 11 and thus the bottom member would be slidable through substantially the entire length of the container, but its movement would be arrested where the widened portion engaged the insert piece. Other suitable stop means might be used as a substitute for this particular form as will be obvious to anyone skilled in the art.

What I claim is:

1. A coin storage container comprising a box-like receptacle including end walls and side walls of uniform width, a bottom closure for the container normally positioned within the area defined by the end and side walls and movable to selective positions outside the container to deposit contents of partitioned portions of the interior from the container, aligned slots disposed at intervals throughout opposed side walls of the container, partitioning members of the same width as the side and end walls fitted between aligned slots to divide the interior of the container into a plurality of compartments for the storage of coins of different denomination, each compartment being adapted to receive coins of a single denomination, and means carried by the container for sliding the bottom selectively into register with each of said partitioning members, whereby to cause the coins of an adjoining compartment to fall from the container under gravitational influence.

2. A coin storage container comprising a box-like receptacle including end walls and side walls of uniform width, a bottom closure for the container normally positioned within the area defined by the end and side walls and movable to selective positions outside the container to deposit contents of partitioned portions of the interior from the container, partitioning members of the same width as the side and end walls fitted between the side walls to divide the interior of the container into a plurality of compartments for the storage of coins of different denomination, each compartment being adapted to receive coins of a single denomination, means carried by the container for sliding the bottom selectively into register with each of said partitioning members, whereby to cause the coins of an adjoining compartment to fall from the container under gravitational influence, and a top closure for the container normally in engagement with the tops of the end and side walls and the partitioning members to prevent the displacement of coins from the compartments or the interchange of coins in the container, said top closure being movable to a second position providing access to the compartments of the container.

3. A coin storage container comprising a box-like receptacle including end walls and side walls of uniform width, a bottom closure for the container normally positioned within the area defined by the end and side walls and movable to selective positions outside the container to deposit contents of partitioned portions of the interior from the container, partitioning members of the same width as the side and end walls fitted between the side walls to divide the interior of the container into a plurality of compartments for the storage of coins of different denomination, each compartment being adapted to receive coins of a single denomination, means carried by the container for sliding the bottom selectively into register with each of said partitioning members, whereby to cause the coins of an adjoining compartment to fall from the container under gravitational influence, a movable top closure for the container normally in engagement with the tops of the end and side walls and the partitioning members of the container to prevent the displacement of coins from the compartments or the interchange of coins in the container, and fastening means for holding the bottom closure and the top closure against movement when in closed position.

4. A coin storage container comprising a boxlike receptacle including end walls and side walls of uniform width, a bottom closure for the container normally positioned within the area defined by the end and side walls and movable to selective positions outside the container to deposit contents of partitioned portions of the interior from the container, aligned slots disposed at intervals throughout opposed side walls of the container, partitioning members of the same width as the side and end walls fitted between aligned slots to divide the interior of the container into a plurality of compartments for the storage of coins of different denomination, each compartment being adapted to receive coins of a single denomination, and means carried by the container for sliding the bottom selectively into register with each of said partitioning members, whereby to cause the coins of an adjoining compartment to fall from the container under gravitational influence, said partitioning members being adjustable relative to the walls of the container and to one another to vary the size and area of the compartments.

5. A coin storage container comprising a boxlike receptacle including end walls and side walls of uniform width, a bottom closure for the container normally positioned within the area defined by the end and side walls and movable to selective positions outside the container to deposit contents of partitioned portions of the interior from the container, partitioning members of the same width as the side and end walls fitted between the side walls to divide the interior of the container into a plurality of compartments for the storage of coins of different denomination, each compartment being adapted to receive coins of a single denomination, means carried by the container for sliding the bottom selectively into register with each of said partitioning members, whereby to cause the coins of an adjoining compartment to fall from the container under gravitational influence, and a movable top closure for the container normally in engagement with the tops of the end and side walls and the partitioning members of the container to prevent the displacement of coins from the compartments or the interchange of coins in the container, said partitioning members being movable relative to the end and side walls of the container to adjust the size and area of the compartments.

JO W. ATKINSON.

REFERENCES CITED

The following references are of record in the file of this patent:

UNITED STATES PATENTS

| Number | Name | Date |
|---|---|---|
| 747,414 | Goffe | Dec. 22, 1903 |
| 1,647,275 | Cursons | Nov. 1, 1927 |
| 2,117,653 | Clifton et al. | May 17, 1938 |
| 2,170,245 | Jackson | Aug. 22, 1939 |
| 2,221,024 | Hood | Nov. 12, 1940 |
| 2,443,761 | Bailey | June 22, 1948 |